United States Patent
Shimizu et al.

(10) Patent No.: US 7,793,754 B2
(45) Date of Patent: Sep. 14, 2010

(54) ELECTRIC STEERING SYSTEM FOR RAPIDLY INCREASING DAMPER GAIN AFTER STEERING SPEED EXCEEDS A SPECIFIC VALUE

(75) Inventors: Yasuo Shimizu, Kawachi-gun (JP); Shigeru Yamawaki, Shioya-gun (JP); Kazushige Sugamata, Moka (JP)

(73) Assignee: Honda Motor Co., Ltd., Tokyo (JP)

( * ) Notice: Subject to any disclaimer, the term of this patent is extended or adjusted under 35 U.S.C. 154(b) by 821 days.

(21) Appl. No.: 11/258,479

(22) Filed: Oct. 25, 2005

(65) Prior Publication Data
US 2006/0090953 A1 May 4, 2006

(30) Foreign Application Priority Data
Oct. 29, 2004 (JP) ............................. 2004-315716

(51) Int. Cl.
*B62D 5/04* (2006.01)
*B62D 6/00* (2006.01)
*A01B 69/04* (2006.01)

(52) U.S. Cl. ........................... 180/446; 701/42; 701/46
(58) Field of Classification Search ................ 180/446; 701/42, 46
See application file for complete search history.

(56) References Cited

U.S. PATENT DOCUMENTS

| | | | | |
|---|---|---|---|---|
| 4,819,170 A | * | 4/1989 | Shimizu | 701/41 |
| 5,596,252 A | * | 1/1997 | Shimizu et al. | 318/432 |
| 6,148,948 A | * | 11/2000 | Shimizu et al. | 180/446 |
| 6,161,068 A | * | 12/2000 | Kurishige et al. | 701/41 |
| 6,272,410 B2 | * | 8/2001 | Okanoue et al. | 701/42 |
| 6,570,352 B2 | * | 5/2003 | Hara et al. | 318/432 |
| 6,761,243 B2 | * | 7/2004 | Stout et al. | 180/402 |
| 6,802,226 B2 | * | 10/2004 | Ono et al. | 73/862.325 |
| 6,838,846 B2 | * | 1/2005 | Matsuoka | 318/432 |

FOREIGN PATENT DOCUMENTS

| | | |
|---|---|---|
| JP | 05-024546 | 2/1993 |
| JP | 08-119135 | 5/1996 |
| JP | 2003-137120 | 5/2003 |
| JP | 2004-009857 | 1/2004 |
| JP | 2004-276821 | 10/2004 |
| JP | 2005-088754 | 4/2005 |
| JP | 2005-280541 | 10/2005 |

\* cited by examiner

*Primary Examiner*—Lesley Morris
*Assistant Examiner*—Daniel Yeagley
(74) *Attorney, Agent, or Firm*—Carrier, Blackman & Associates, P.C.; Joseph P. Carrier; William D. Blackman

(57) ABSTRACT

An electric steering system includes a device for measuring a steering input into a steering system; a device for measuring a steering speed; a section for computing a target current based on the steering input; and a control section for applying a steering power to the steering system by driving a motor according to the target current, and applying damping to the steering system based on the steering speed. A rate of increase in a damper gain defined when the steering speed is equal to or greater than a predetermined value is higher than that defined when the steering speed is less than the predetermined value, or the damper gain defined when the steering speed is equal to or greater than a predetermined value has a constant value increased in a step form from values of the damper gain defined when the steering speed is less than the predetermined value.

8 Claims, 8 Drawing Sheets

ELECTRIC STEERING SYSTEM FOR RAPIDLY INCREASING DAMPER GAIN AFTER STEERING SPEED EXCEEDS A SPECIFIC VALUE

BACKGROUND OF THE INVENTION

1. Field of the Invention

The present invention relates to an electric steering system.

Priority is claimed on Japanese Patent Application No. 2004-315716, filed Oct. 29, 2004, the content of which is incorporated herein by reference.

2. Description of the Related Art

As a steering system for a vehicle, an electric power steering system is known, in which a steering shaft coupled to a steering wheel is mechanically coupled to a steering mechanism for steering steered wheels of the vehicle, and an electric motor for assisting steering power is linked to the steering mechanism. Generally, an electric current for driving the motor is controlled in a manner such that the greater the steering input (such as steering torque) applied to the steering wheel by an operation of the driver, the greater the assistant steering power.

In an example of the electric power steering system, the current for driving the motor is controlled so as to apply damping to a steering shaft in accordance with a steering (rotation) speed of the steering wheel (see, for example, Japanese Unexamined Patent Application, First Publication No. H05-024546).

FIG. 11 is a diagram showing the structure of a conventional electric power steering system 1000 (i.e., an electric steering system). FIG. 2 is an enlarged sectional view showing a vicinity of a rack end of the electric steering system similar to the electric steering system 1000 shown in FIG. 11. When the steering mechanism employs a rack and pinion system, generally (see FIGS. 11 and 2) both heads of a rack (shaft) 8 protrude from open ends of a rack housing 21 of a steering gear box, and a tie rod 9 is coupled to a rack end 8b attached to each head of the rack 8. In this steering mechanism, when the steering wheel is rotated to the utmost limit, a stopper 13 provided on the inner side of the rack end 8b hits a fitting portion 22 of the rack housing 21, so that the rotation of the steering wheel is restricted and the rotation angle of the steering wheel reaches a maximum value.

In the steering mechanism having the above-described structure, when the rotation angle of the steering wheel reaches the maximum, the stopper 13 may be compressed and deformed between the rack end 8b and the fitting portion 22 of the rack housing 21. In such a case, the rack end 8b may hit the open end 21a of the rack housing 21, thereby generating a foreign sound. In addition, when the rack end 8b hits the open end 21a, an impact load may be applied on the rack end 8b, the open end 21a of the rack housing 21, a rack and pinion mechanism having a pinion 7 and a rack teeth of the rack 8 which are engaged with each other, or a bearing or a housing for supporting the rack and pinion mechanism.

SUMMARY OF THE INVENTION

In view of the above circumstances, an object of the present invention is to provide an electric steering system for reducing an impact load applied when the rotation angle of the steering wheel is the maximum, and for preventing generation of a foreign sound, thereby improving the commodity value of the system.

Therefore, the present invention provides an electric steering system (e.g., an electric power steering system 100 in a first embodiment explained below) comprising:

a steering input measuring device (e.g., a steering torque sensor 30 in the embodiment) for measuring a steering input which is input into a steering system;

a steering speed measuring device (e.g., a rotation speed computing section 55 in the embodiment) for measuring a steering speed of the steering system;

a target current computing section (e.g., an ECU 50 in the embodiment) for computing a target current based on the steering input measured by the steering input measuring device; and a control section (e.g., the ECU 50 in the embodiment) for applying a steering power to the steering system by driving a motor (e.g., a motor 11 in the embodiment) according to the target current, and applying damping to the steering system based on the steering speed measured by the steering speed measuring device, wherein the control section performs a damper gain control in which a rate of increase in a damper gain for the damping defined when the steering speed is equal to or greater than a predetermined value is higher than a rate of increase in the damper gain defined when the steering speed is less than the predetermined value.

According to the above structure, after the steering speed exceeds the predetermined value, the damper gain for the damping rapidly increases, so that steering suddenly feels heavy to the driver, thereby reducing the speed of the driver's steering operation.

The present invention also provides an electric steering system (e.g., an electric power steering system 100 in the first embodiment explained below) comprising:

a steering input measuring device (e.g., a steering torque sensor 30 in the embodiment) for measuring a steering input which is input into a steering system;

a steering speed measuring device (e.g., a rotation speed computing section 55 in the embodiment) for measuring a steering speed of the steering system;

a target current computing section (e.g., an ECU 50 in the embodiment) for computing a target current based on the steering input measured by the steering input measuring device; and a control section (e.g., the ECU 50 in the embodiment) for applying a steering power to the steering system by driving a motor (e.g., a motor 11 in the embodiment) according to the target current, and applying damping to the steering system based on the steering speed measured by the steering speed measuring device, wherein the control section performs a damper gain control in which a damper gain for the damping defined when the steering speed is equal to or greater than a predetermined value has a constant value which is increased in a step form from values of the damper gain defined when the steering speed is less than the predetermined value.

According to the above structure, after the steering speed exceeds the predetermined value, the damper gain for the damping suddenly increases, so that steering suddenly feels heavy to the driver, thereby reducing the speed of the driver's steering operation.

According to the above structures, it is possible to reduce the moving speed of a member which hits a fitting portion when the rotation angle of the steering wheel is the maximum, thereby preventing generation of a foreign sound due to hitting of the member and reducing impact loads applied at the maximum rotation angle of the steering wheel.

Preferably, the damper gain is increased in accordance with an increase in the vehicle speed. In this case, it is possible that the higher the vehicle speed, the greater the damper gain for the damping. Therefore, when the driving state is switched from a low-speed running to a high-speed running, the speed of the driver's steering operation can be reduced, thereby reducing the moving speed of a member which hits a fitting portion when the rotation angle of the steering wheel is the maximum.

The electric steering system may further comprise:

a steering angle measuring device for measuring a steering angle of the steering system, wherein when the steering angle measured by the steering angle measuring device is equal to or greater than a predetermined value, the control section performs the damper gain control.

Accordingly, it is possible to increase the damper gain only when the steering angle is equal to or greater than the predetermined value (e.g., a value close to the maximum rotation angle of the steering wheel). Therefore, it is possible to reliably prevent generation of a foreign sound when the steering angle is equal to or greater than the predetermined value and to reliably reduce impact loads applied at the maximum rotation angle of the steering wheel.

The present invention also provides an electric steering system (e.g., an electric power steering system 100 in a second embodiment explained below) comprising:

a steering torque measuring device (e.g., a steering torque sensor 30 in the embodiment) for measuring a steering torque input into a steering system;

a steering speed measuring device (e.g., a rotation speed computing section 55 in the embodiment) for measuring a steering speed of the steering system;

a target current computing section (e.g., a target current computing section 58 and the like in an ECU 50 in the embodiment) for computing a target current based on the steering torque measured by the steering torque measuring device; and a control section (e.g., the ECU 50 in the embodiment) for applying a steering power to the steering system by driving a motor (e.g., a motor 11 in the embodiment) according to the target current, wherein:

when the steering speed measured by the steering speed measuring device is less than a predetermined speed value, the control section applies damping to the steering system based on the steering speed measured by the steering speed measuring device; and when the steering speed measured by the steering speed measuring device is equal to or greater than the predetermined speed value, the control section performs a control operation of adding a specified steering torque defined when the steering speed is equal to the predetermined speed value and an increment for the steering torque determined in accordance with the steering speed to each other, defining the sum of the addition as a target steering torque, and controlling the target current so that the steering torque measured by the steering torque measuring device coincides with the target steering torque.

According to the above structure, after the steering speed exceeds the predetermined value, the steering torque rapidly increases, so that steering suddenly feels heavy to the driver, thereby reducing the speed of the driver's steering operation. Therefore, it is possible to reduce the moving speed of a member which hits a fitting portion when the rotation angle of the steering wheel is the maximum, thereby preventing generation of a foreign sound due to hitting of the member and reducing impact loads applied at the maximum rotation angle of the steering wheel.

This electric steering system may further comprise:

a steering angle measuring device for measuring a steering angle of the steering system, wherein when the steering angle measured by the steering angle measuring device is equal to or greater than a predetermined value and the steering speed is equal to or greater than the predetermined speed value, the control section performs the control operation.

Accordingly, it is possible to increase the steering torque only when the steering angle is equal to or greater than the predetermined value (e.g., a value close to the maximum rotation angle of the steering wheel). Therefore, it is possible to reliably prevent generation of a foreign sound when the steering angle is equal to or greater than the predetermined value and to reliably reduce impact loads applied at the maximum rotation angle of the steering wheel.

DETAILED DESCRIPTION OF THE INVENTION

Hereinafter, embodiments of the electric steering system according to the present invention will be explained with reference to FIGS. 1 to 10.

FIRST EMBODIMENT

A first embodiment will be explained with reference to FIGS. 1 to 5.

Figure 1:
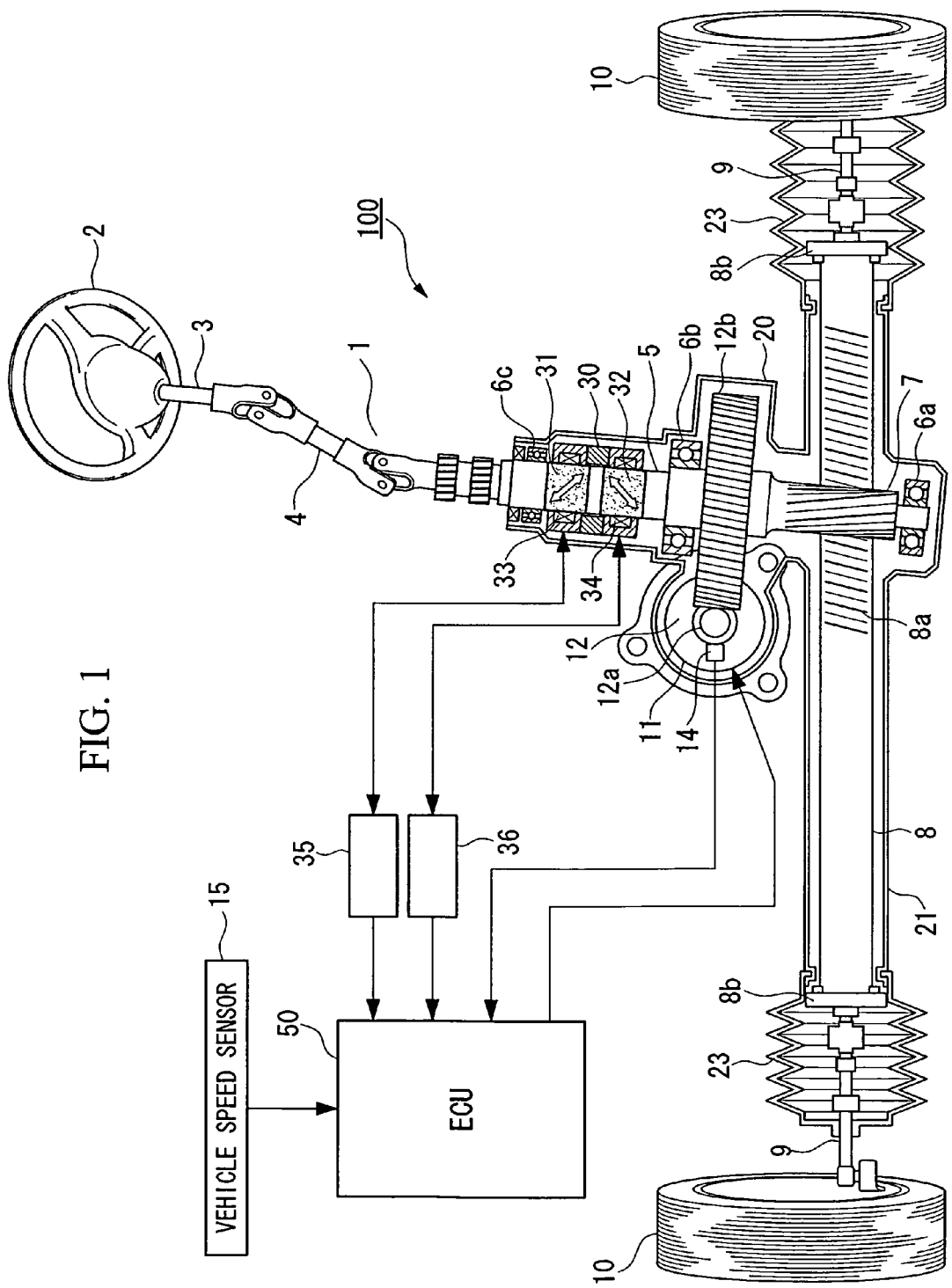
FIG. 1 is a diagram showing the structure of an electric power steering system according to the present invention.

FIG. 1 is a diagram showing the structure of an electric power steering system 100 (i.e., an electric steering system) according to the present invention. As shown in FIG. 1, the electric power steering system 100 has a steering shaft 1 coupled to a steering wheel 2 (i.e., a steering device).

In the steering shaft 1, a main steering shaft 3, which is integrally coupled to the steering wheel 2, is coupled via a universal joint 4 to a pinion shaft 5 at which a pinion 7 of a rack and pinion mechanism is provided.

A lower portion, an intermediate portion, and an upper portion of the pinion shaft 5 are respectively supported by bearings 6a, 6b, and 6c, and the pinion 7 is attached to a lower end of the pinion shaft 5. The pinion 7 engages with rack teeth 8a of a rack (shaft) 8 which can perform reciprocation in the width direction of the vehicle. At either end of the rack 8, rack ends 8b are provided, to which tie rods 9 are respectively coupled. Front wheels 10 are linked as steered wheels to the tie rods 9. According to the above structure, an ordinary rack and pinion steering operation can be performed by operating the steering wheel 2, thereby steering the front wheels 10 and turning the vehicle. The rack 8 and the tie rods 9 constitute a steering mechanism.

The electric power steering system 100 also includes a brushless motor 11 (simply called the "motor" hereinbelow) for supplying an assistant steering power so as to reduce the steering power generated by the steering wheel 2. A torque generated by the motor 11 (i.e., an assistance torque) is boosted by a reduction device 12 and then transmitted to the pinion shaft 5. The reduction device 12 consists of (i) a worm gear 12a provided at an output shaft of the motor 11 and (ii) a worm wheel gear 12b which is provided at the pinion shaft 5 and engaged with the worm gear 12a.

When the steering torque input from the steering wheel 2 is indicated by Ts, the assistant steering power is indicated by AH, and AH has a coefficient KA of a constant value, a torque Tp of the pinion shaft 5 as a load can be represented by the following formula (1).

$$Tp=Ts+AH=Ts+KA\cdot TS \quad (1)$$

Therefore, the steering torque Ts can be represented by the following formula (2).

$$Ts=Tp/(1+KA) \quad (2)$$

Accordingly, the steering torque Ts can be reduced in comparison with the torque Tp of the pinion shaft 5, as shown in formula (2).

The motor 11 has a resolver 14 for measuring the rotation angle of the motor 11. The resolver 14 outputs an electrical signal corresponding to the measured rotation angle of the motor 11 to a steering electronic control unit (ECU) 50.

Between the intermediate bearing 6b and the upper bearing 6c at the pinion shaft 5, a magnetostrictive steering torque sensor 30 (as a steering torque measuring device or a steering input measuring device) is provided, which measures the steering torque based on a variation in magnetic characteristics due to magnetostriction.

The steering torque sensor 30 has (i) magnetostrictive films 31 and 32 surrounding an outer peripheral surface of the pinion shaft 5, (ii) measurement coils 33 and 34 which respectively face the magnetostrictive films 31 and 32, and (iii) measurement circuits 35 and 36 which are respectively connected to the measurement coils 33 and 34. The measurement circuits 35 and 36 respectively convert variations in inductances of the measurement coils 33 and 34 due to magnetostriction to variations in voltages, and output the converted results to the ECU 50. The ECU 50 computes the steering torque applied to the steering shaft 1 based on values output from the measurement circuits 35 and 36.

Figure 2:
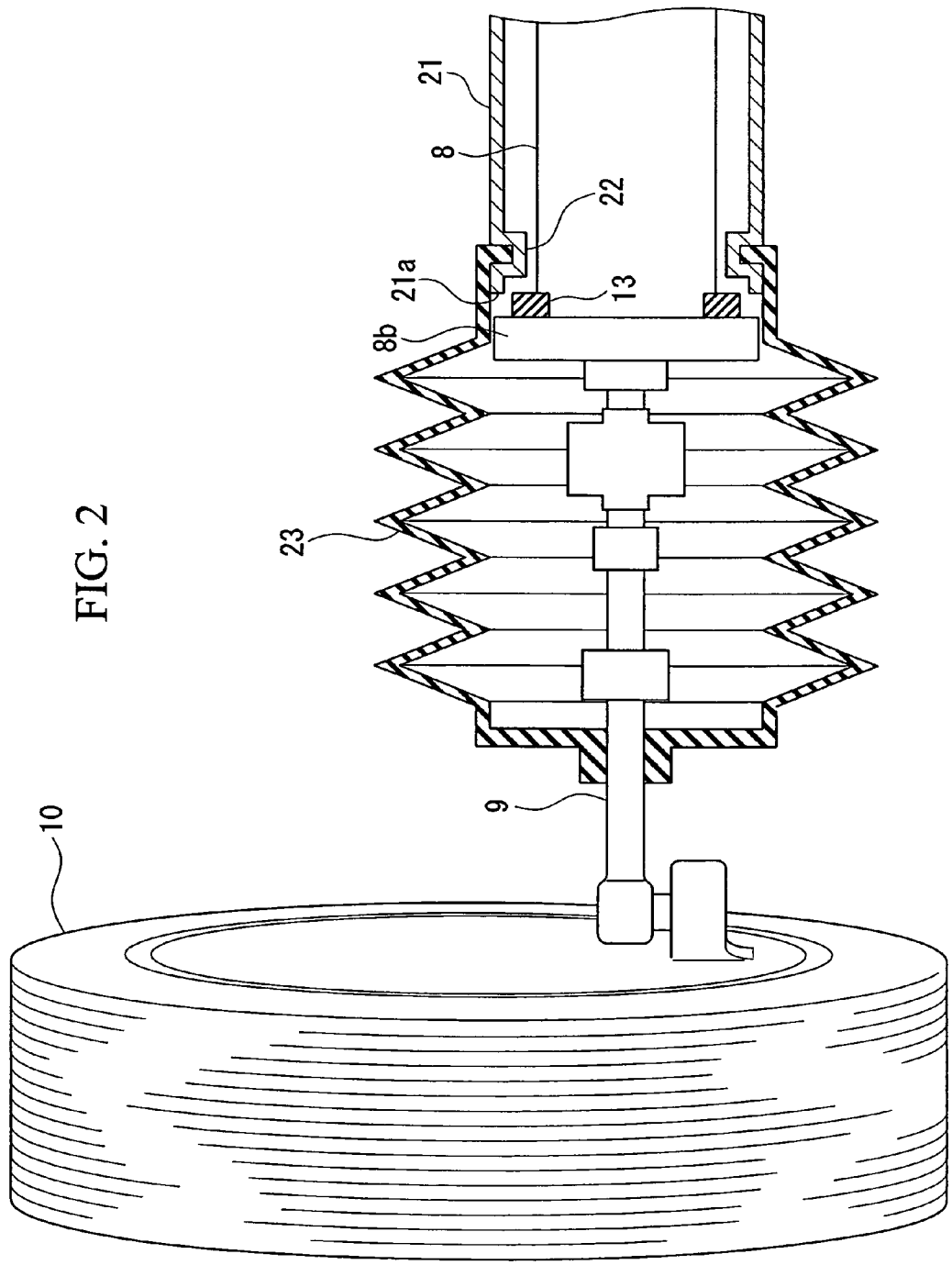
FIG. 2 is an enlarged sectional view showing a vicinity of a rack end of the electric power steering system of FIG. 1.

The rack 8 is contained in a steering gear box 20, together with the pinion shaft 5, the motor 11, and the reduction device 12. In particular, the rack 8 is contained in a rack housing 21 of the steering gear box 20. FIG. 2 is an enlarged sectional view showing a vicinity of a rack end of the electric power steering system 100. As shown in FIG. 2, both ends of the rack housing 21 are open, and both ends of the rack 8 protrude from the open ends of the rack housing 21, so that rack ends 8b are always positioned outside the rack housing 21. To a face of each rack end 8b toward the inside in the width direction of the vehicle, a ring-shaped stopper 13 is attached. The rotation of the steering wheel 2 is restricted when the stopper 13 hits a fitting portion 22 formed in the vicinity of each end of the rack housing 21. When the rotation is restricted, the rotation angle has a maximum value.

To each end of the rack housing 21, a bellows-shaped rack end cover 23 is attached, which is capable of expansion and contraction The rack end 8b is movably contained in the rack end cover 23, and the tie rod 9 passes through and protrudes from the rack end cover 23.

In addition, a vehicle speed sensor 15 is provided at an appropriate position of the vehicle body. The vehicle speed sensor 15 outputs an electrical signal corresponding to the vehicle speed to the ECU 50.

The ECU 50 processes signals input from the resolver 14, the vehicle speed sensor 15, the steering torque sensor 30, and the like, so as to obtain control signals by which a target current supplied to the motor 11 is determined. The ECU 50 controls the torque output from the motor by performing PID (proportional-integral-differential) control so that the current flowing in the motor 11 coincides with the target current, thereby controlling the assistant steering power.

Figure 3:
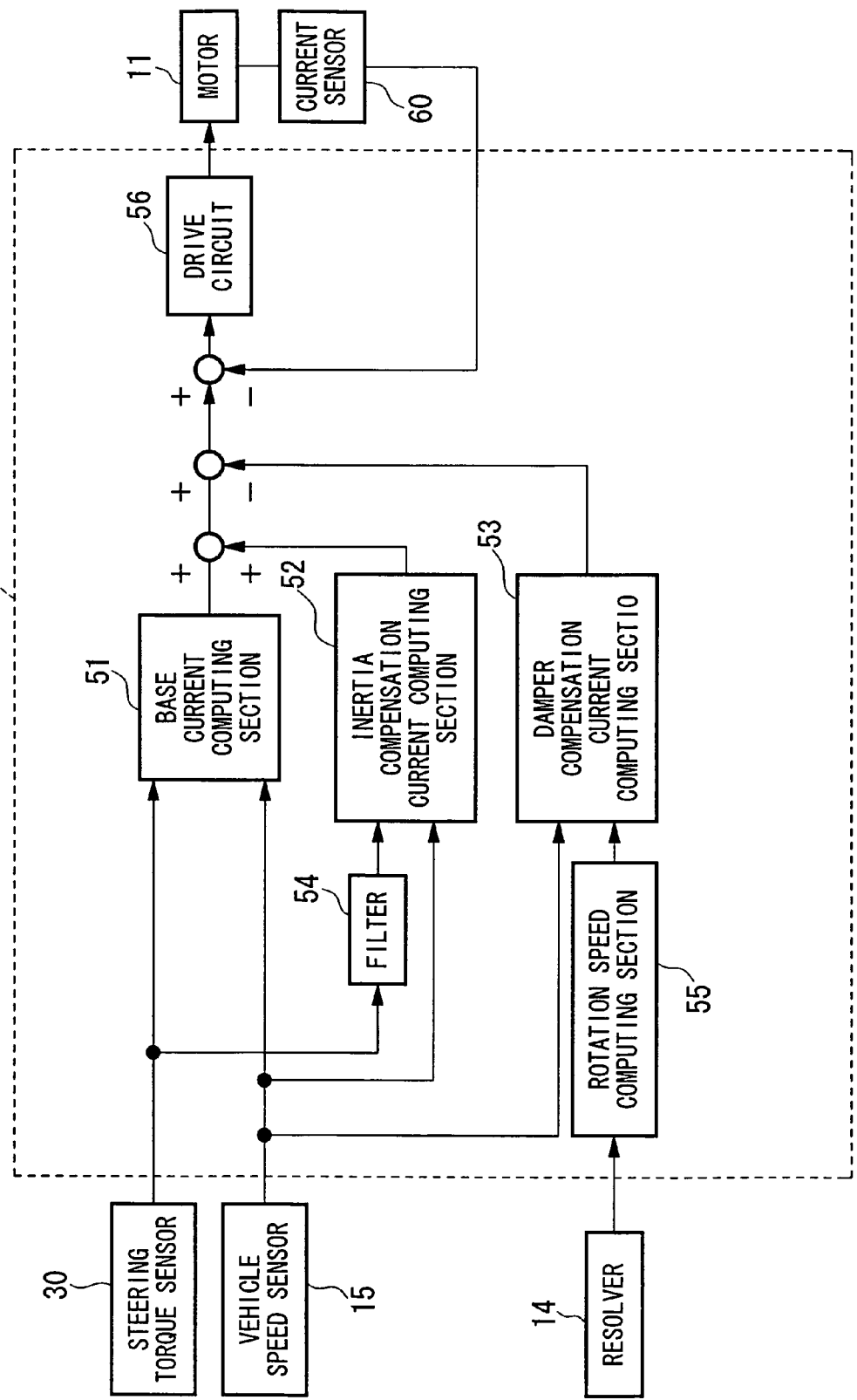
FIG. 3 is a block diagram for the current control of the motor in the first embodiment of the electric power steering system.

Below, the current control of the motor 11 in the first embodiment will be explained with reference to a block diagram in FIG. 3.

The ECU 50 has a base current computing section 51, an inertia compensation current computing section 52, a damper compensation current computing section 53, a filter 54, a rotation speed computing section 55, and a drive circuit 56.

Based on the steering torque measured by the steering torque sensor 30 and the vehicle speed measured by the vehicle speed sensor 15, the base current computing section 51 computes a base current in accordance with the steering torque and the vehicle speed by referring to a base current table (not shown). In the base current table of the present embodiment, the greater the steering torque, (i) the greater the gain of the base current, and (ii) the higher the vehicle speed, the smaller the gain of the base current and the wider the dead band of the base current. In such a setting, a substantially responsive feeling relating to the steering torque can be provided according to an increase in the vehicle speed.

The steering torque measured by the steering torque sensor 30 is temporally differentiated by the filter 54, thereby computing a temporally differentiated value of the steering torque.

Based on the temporally differentiated value of the steering torque output from the filter 54 and the vehicle speed measured by the vehicle speed sensor 15, the inertia compensation current computing section 52 computes an inertia compensation current in accordance with the temporally differentiated value of the steering torque and the vehicle speed, by referring to an inertia compensation current table (not shown). The inertia compensation current is made to flow through the motor 11 so as to cancel the moment of inertia of the motor 11 and the steering system. In the inertia compensation current table of the present embodiment, the higher the vehicle speed, the smaller the gain of the inertia compensation current.

The rotation angle of the motor 11 measured by the resolver 14 is temporally differentiated by the rotation speed computing section 55 (i.e., a steering speed measuring device), thereby computing a temporally differentiated value of the rotation angle, that is, a rotation speed S of the motor. In the electric power steering system 100, the output shaft of the motor 11 and the steering shaft 1 are connected with each other via the reduction device 12 (i.e., the worm gear 12a and the worm wheel gear 12b), so that the steering rotation speed of the steering wheel 2 is in proportion with the rotation speed of the motor 11.

Figure 4:
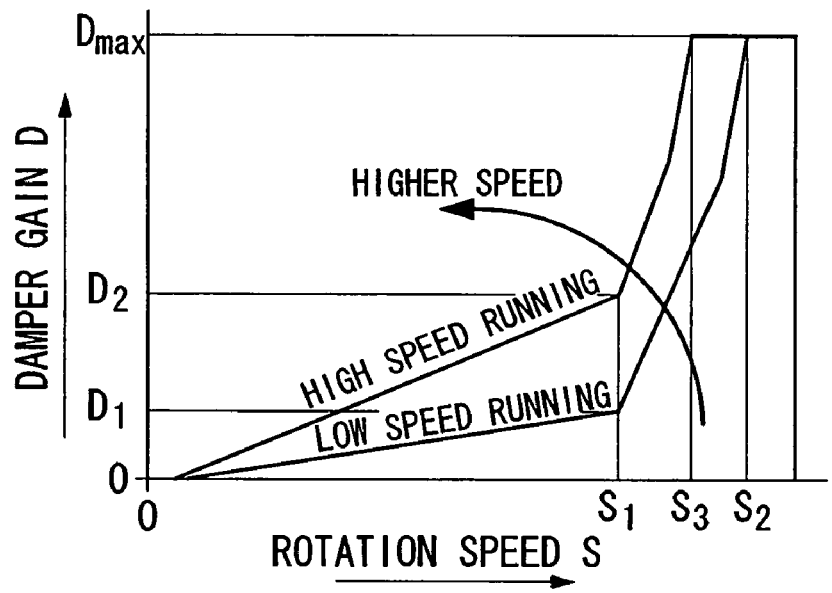
FIG. 4 is a graph for explaining an example of a damper compensation current table in the first embodiment.

Based on the rotation speed S of the motor 11 measured by the rotation speed computing section 55 and the vehicle speed measured by the vehicle speed sensor 15, the damper compensation current computing section 53 computes a damper compensation current in accordance with the rotation speed S of the motor 11 and the vehicle speed, by referring to a damper compensation current table based on a graph as shown in FIG. 4. In the damper compensation current table of the present embodiment, the higher the rotation speed S of the motor 11, the greater the gain of the damper compensation current (called the damper gain D, hereinbelow). In particular, the rate of increase in the damper gain D when the rotation speed S is equal to or greater than a predetermined value $S_1$ is higher than that when the rotation speed S is less than the predetermined value $S_1$. In other words, the rate of increase in the damper gain D when the steering speed is equal to or greater than a predetermined value is higher than that when the steering speed is less than the predetermined value. Also in the damper compensation current table, when the rotation speed S is equal to or greater than a predetermined value $S_2$ (or $S_3$) which is greater than $S_1$, the damper gain D has a constant value, that is, the maximum value $D_{max}$.

Additionally, in the present damper compensation current table, the greater the vehicle speed, the greater the damper gain D. In FIG. 4, for convenience of explanations, only two lines of table data corresponding to a low vehicle speed and a high vehicle speed are shown. However, of course, a larger number of vehicle speed values or sections may be defined, and table data for the larger number of vehicle speed values or sections may be provided.

The ECU 50 adds the base current computed by the base current computing section 51 and the inertia compensation current computed by the inertia compensation current computing section 52, and subtracts the damper compensation current computed by the damper compensation current computing section 53 from the sum of the above addition, so as to compute a target current which is input into the drive circuit 56. The current flowing through the motor 11, measured by a current sensor 60, is also input into the drive circuit 56. The ECU 50 controls the torque output from the motor 11 by performing PID control so that the current measured by the current sensor 60 coincides with the target current, thereby controlling the assistant steering power.

In the above control, the damper compensation current is an element for applying damping to the steering system so as to reduce the assistant steering power. Therefore, the higher the vehicle speed and the rotation speed S of the motor 11, the greater the damper compensation current, thereby improving convergence of the steering system (i.e., the steering wheel 2) to a neutral point, and reliability in steering when the vehicle runs at a high speed.

As described above, in the damper compensation current table of the present embodiment, the rate of increase in the damper gain D when the rotation speed S is equal to or greater than a predetermined value $S_1$ is considerably higher than that when the rotation speed S is less than the predetermined value $S_1$. Therefore, when the rotation speed S increases after reaching the predetermined value $S_1$ (that is, after the steering speed reaches a predetermined value), the damper compensation current rapidly increases, so that the assistant steering power rapidly decreases. Accordingly, in order to maintain the rotation speed of the steering wheel 2, the steering torque should be rapidly increased so as to compensate for the decrease in the assistant steering power. In other words, if the steering torque cannot be rapidly increased so as to compensate for the decrease in the assistant steering power, the rotation speed S cannot be maintained at the predetermined value $S_1$ or greater, and as a result, the rotation speed S is lowered to a value less than $S_1$.

The same result is obtained when the steering wheel 2 is rotated to have the maximum rotation angle. That is, even if there is a steering input by the steering wheel 2 at a high steering speed in the vicinity of the maximum rotation angle of the steering wheel 2, when the rotation speed S of the motor 11 increases after reaching the predetermined value $S_1$ (that is, after the steering speed reaches a predetermined value), the assistant steering power rapidly decreases and the rotation speed S is lowered to the predetermined value $S_1$ or smaller, so that the moving speed of the rack 8 in the width direction of the vehicle is also reduced.

As a result, when the stopper 13 fits to the fitting portion 22 of the rack housing 21 at the maximum rotation angle of the steering wheel 2, the moving speed of the rack 8 can be lower. Therefore, it is possible to suppress compressive deformation of the stopper which is caught between the rack end 8b and the fitting portion 22. Even if the stopper 13 is compressively deformed and the rack end 8b hits an open end 21a of the rack housing 21, generation of a foreign sound can be reduced. In addition, the moving speed of the rack 8 can be reduced before the rotation angle of the steering wheel 2 reaches the maximum. Therefore, when the rotation angle of the steering wheel 2 reaches the maximum, it is possible to reduce impact loads applied to an engaging portion of the rack teeth 8a and the pinion 7, and the bearings 6a and 6b and the steering gear box 20 which support the rack 8 and the pinion 7.

The above function will be explained in view of kinetic energy.

With the moment of inertia IM of the motor 11, the moment of inertia IH of the steering wheel 2, and the rotational angular velocity w, the kinetic energy produced by inertia of the steering wheel 2 and the motor 11 is represented by the following formula (3).

$$KD=(IM+IH)w^2/2 \quad (3)$$

That is, the kinetic energy KD increases proportionally with the rotational angular velocity w of the steering wheel 2 and the motor 11. Therefore, the kinetic energy KD can be remarkably reduced by decreasing the rotational angular velocity w so that the moving speed of the rack 8 is reduced. As a result, in addition to it being possible to suppress the generation of a foreign sound at the maximum rotation angle of the steering wheel 2, it is also possible to reduce impact loads applied to an engaging portion of the rack teeth 8a and the pinion 7, and the bearings 6a and 6b and the steering gear box 20 which support the rack 8 and the pinion 7.

Furthermore, the rotation speed of the motor 11 can be reduced; thus, the sound of operation of the rotating motor 11 can be reduced, thereby improving quietness of the electric power steering system 100.

Figure 5:
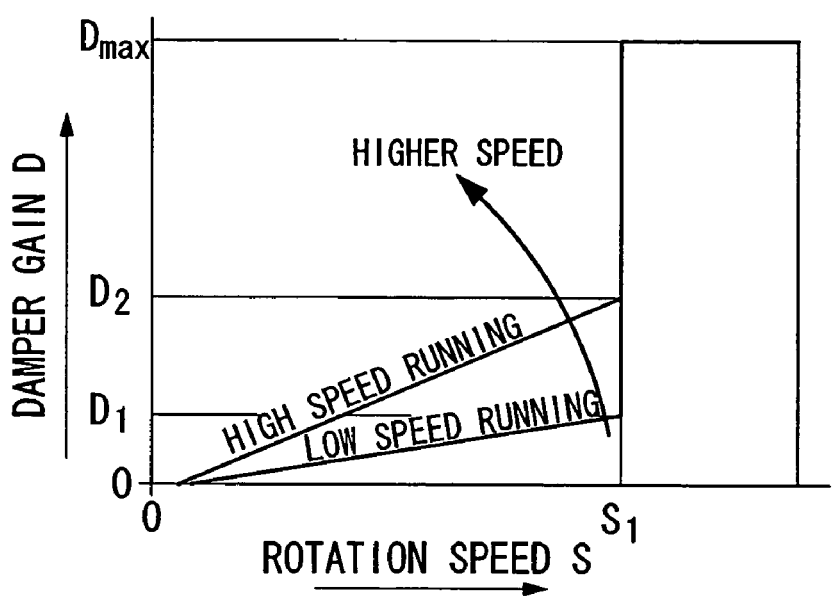
FIG. 5 is a graph for explaining another example of the damper compensation current table in the first embodiment.
Figure 6:
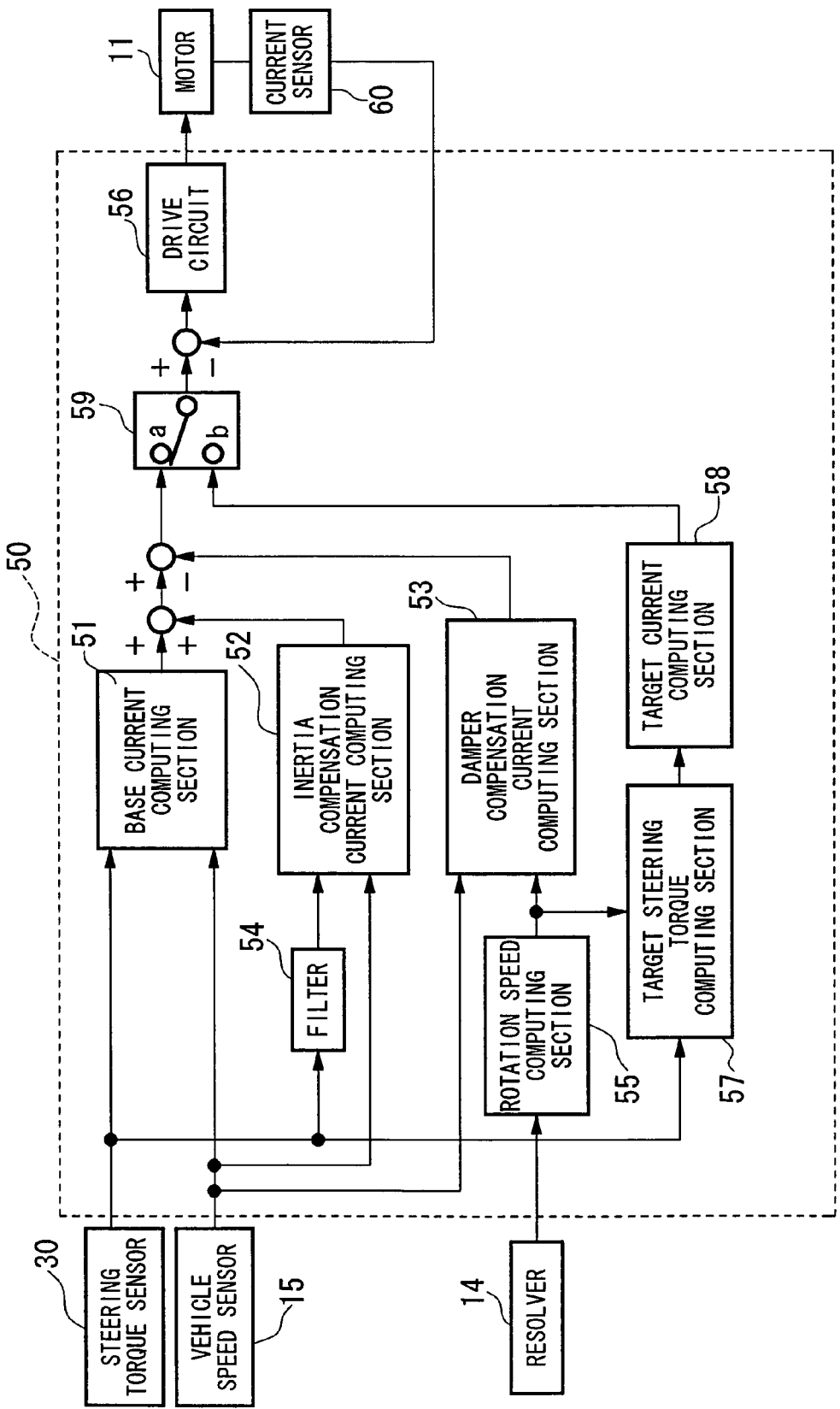
FIG. 6 is a block diagram for the current control of the motor in the second embodiment of the electric power steering system.

In the above embodiment, after the rotation speed S of the motor 11 exceeds the predetermined value $S_1$, the damper gain D rapidly increases in accordance with the patterns defined in the damper compensation current table based on a graph as shown in FIG. 4. However, this is not a restrictive manner. For example, in accordance with a damper compensation current table as shown in FIG. 5, when the rotation speed S of the motor 11 reaches the predetermined value $S_1$, the damper gain D may be immediately increased to the maximum value $D_{max}$. Also in this case in which the damper gain D is increased to a constant value (i.e., in a step form) while the steering speed is equal to or greater than a predetermined value in comparison with the damper gain D while the steering speed is less than the predetermined value, it is possible to suppress the generation of a foreign sound at the maximum rotation angle of the steering wheel 2, and to reduce a load applied to an engaging portion of the rack teeth 8a and the pinion 7, similarly to the above embodiment.

The process of (i) increasing the rate of increase in the damper gain D or (ii) increasing the damper gain D to a constant value in a step form when the steering speed is equal to or greater than a predetermined value may be performed only when the steering angle of the steering wheel 2 is equal to or greater than a predetermined value. In this case, the moving speed of the rack 8 can be reduced only when the steering angle becomes close to the maximum rotation angle of the steering wheel 2, thereby reliably suppressing the generation of a foreign sound at the maximum rotation angle of the steering wheel 2. The steering angle measuring device for measuring the steering angle may consist of a steering angle sensor for measuring the rotation angle of the steering wheel 2, or the steering angle may be computed based on the rotation angle of the motor 11 measured by the resolver 14 (in the above embodiment) because the rotation angle of the steering wheel 2 is proportional to the rotation angle of the motor 11.

SECOND EMBODIMENT

A second embodiment of the present invention will be explained with reference to FIGS. 6 to 10. The hardware structure of the electric power steering system of the second embodiment is the same as the electric power steering system 100 in the first embodiment; thus explanations thereof are omitted, and FIGS. 1 and 2 are referred to also in the present embodiment.

Between the first and the second embodiments, the methods of defining the target current for the motor 11 are different. Below, the current control of the motor 11 in the second embodiment will be explained with reference to a block diagram in FIG. 6.

In the second embodiment, the ECU 50 has a base current computing section 51, an inertia compensation current computing section 52, a damper compensation current computing section 53, a filter 54, a rotation speed computing section 55, a drive circuit 56, a target steering torque computing section 57, a target current computing section 58, and a switching device 59.

The switching device 59 is provided for switching the computation of the target current of the motor 11 in accordance with the rotation speed S of the motor 11. More specifically, when the rotation speed S is less than a predetermined value A, a contact a is connected (i.e., switched ON) while a contact b is disconnected (i.e., switched OFF), and when the rotation speed S is equal to or greater than the predetermined value A, the contact a is switched OFF while the contact b is switched ON.

First, the process of computing the target current of the motor 11 when the rotation speed S is less than the predetermined value A will be explained.

Operations of the base current computing section 51, the inertia compensation current computing section 52, the filter 54, and the rotation speed computing section 55 are identical to those in the first embodiment, and explanations thereof are omitted.

Also in the second embodiment, based on the rotation speed S of the motor 11 measured by the rotation speed computing section 55 and the vehicle speed measured by the vehicle speed sensor 15, the damper compensation current computing section 53 computes a damper compensation current in accordance with the rotation speed S of the motor 11 and the vehicle speed, by referring to a damper compensation current table. However, the damper compensation current table is different from that used in the first embodiment.

Figure 7:
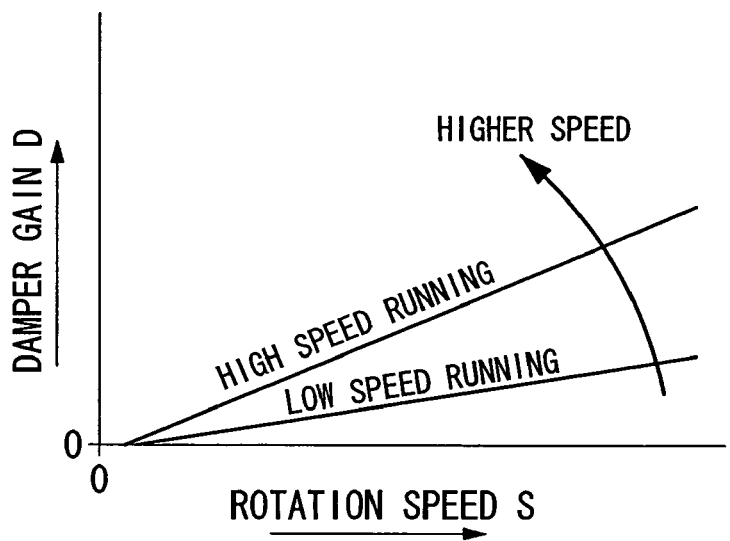
FIG. 7 is a graph for explaining an example of a damper compensation current table in the second embodiment.

As shown in FIG. 7, in the damper compensation current table of the second embodiment, in accordance with an increase in the rotation speed S of the motor 11, the gain of the damper compensation current (called the damper gain D, hereinbelow) increases in a linear-function form at a constant rate of increase in the damper gain D. Similarly to the first embodiment, in the damper compensation current table of the second embodiment, the higher the vehicle speed, the greater the damper gain D.

The ECU 50 adds the base current computed by the base current computing section 51 and the inertia compensation current computed by the inertia compensation current computing section 52, and subtracts the damper compensation current computed by the damper compensation current computing section 53 from the sum of the above addition, so as to compute a target current output to the contact a of the switching device 59.

Next, the process of computing the target current of the motor 11 when the rotation speed S is equal to or greater than the predetermined value A will be explained.

Figure 8:
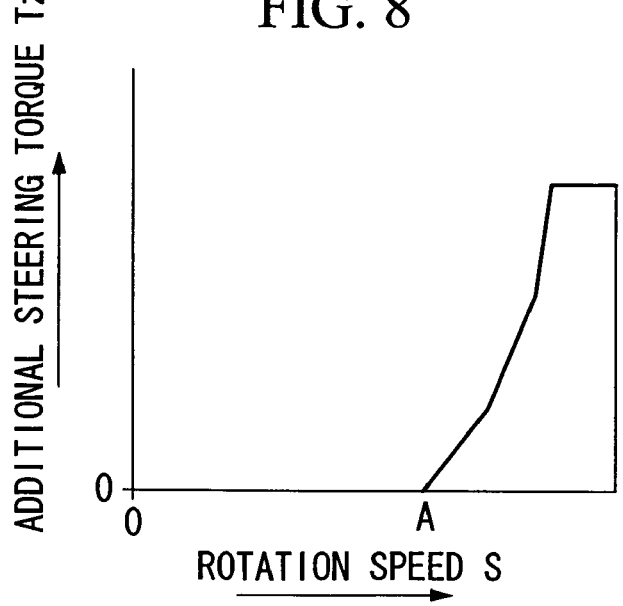
FIG. 8 is a graph for explaining an example of an additional steering torque table in the second embodiment.

When the rotation speed S measured by the rotation speed computing section 55 has the predetermined value A, the target steering torque computing section 57 stores the steering torque measured by the steering torque sensor 30 (called the specified steering torque Ta, hereinbelow), and computes an increment for the steering torque (called an additional steering torque Tz, hereinbelow) in accordance with the rotation speed S, by referring to an additional steering torque table as shown in FIG. 8. The target steering torque computing section 57 then computes a target steering torque T0 by adding the additional steering torque Tz to the specified steering torque Ta (i.e., T0=Ta+Tz).

In the additional steering torque table 8 of the second embodiment, when the rotation speed S is less than the predetermined value A, the additional steering torque Tz is zero, and when the rotation speed S is equal to or greater than the predetermined value A, the additional steering torque Tz gradually increases in accordance with the increase in the rotation speed S in a manner such that the rate of increase in the additional steering torque Tz steps up according to the increase in the rotation speed S.

The target current computing section 58 computes a target current of the motor 11 so that the steering torque Ts measured by the steering torque sensor 30 (i.e., the actual steering torque) coincides with the target steering torque T0 with respect to a present load torque TL (see below). In other words, an assistance torque Tas (corresponding to an assistant steering power) is determined so as to make the actual steering torque Ts coincide with the target steering torque T0.

The load torque TL, the actual steering torque Ts, and the assistance torque Tas (which is generated by the motor 11) have a relationship of "TL=Ts+Tas". Therefore, If the load torque TL is constant, when the actual steering torque Ts increases, the assistance torque Tas decreases. In other words, when the assistance torque Tas is decreased, the same load torque TL cannot be obtained without an increase in the actual steering torque Ts, and thus the driver has a heavy steering feeling.

Figure 9:
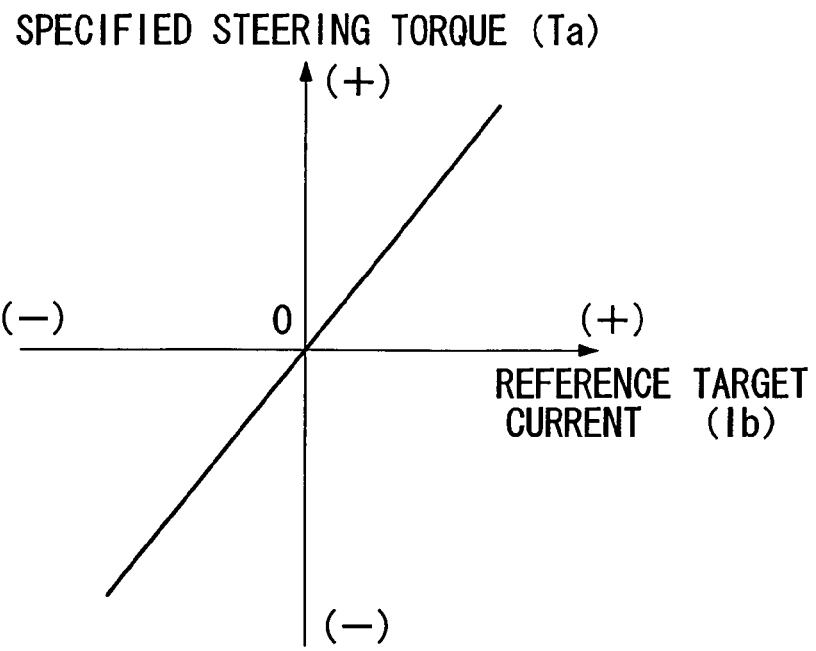
FIG. 9 is a graph for explaining an example of a reference target current table in the second embodiment.

In the present embodiment, the target current of the motor 11 is computed as follows. First, a reference target current Ib corresponding to the specified steering torque Ta (obtained when the rotation speed S of the motor 11 is the predetermined value A) is computed by referring to a reference target current table based on a graph as shown in FIG. 9. In this reference target current table, the reference target current Ib=0 when the specified steering torque Ta=0, and the reference target current Ib increases in a linear-function form in accordance with an increase in the specified steering torque Ta.

Figure 10:
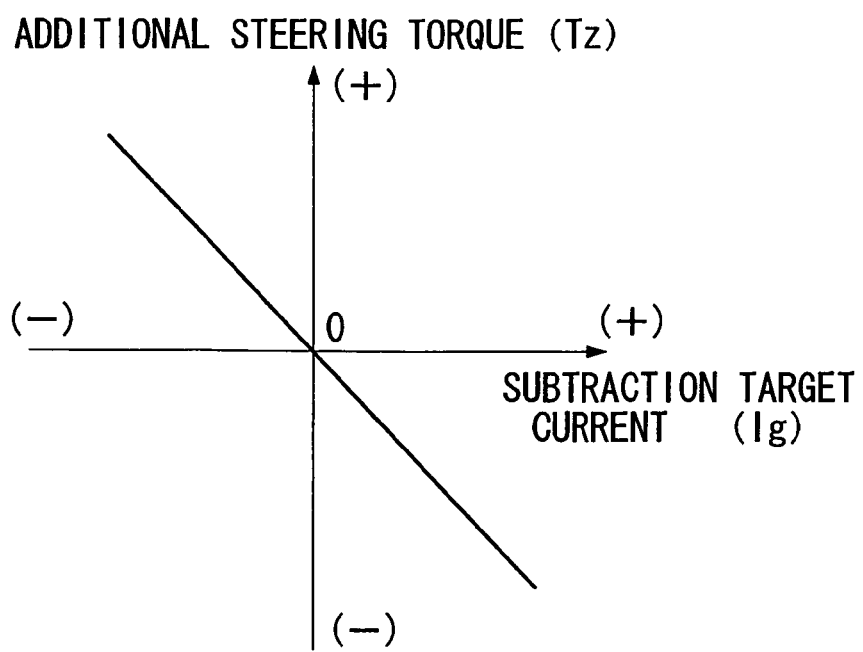
FIG. 10 is a graph for explaining an example of a subtraction target current table in the second embodiment.
Figure 11:
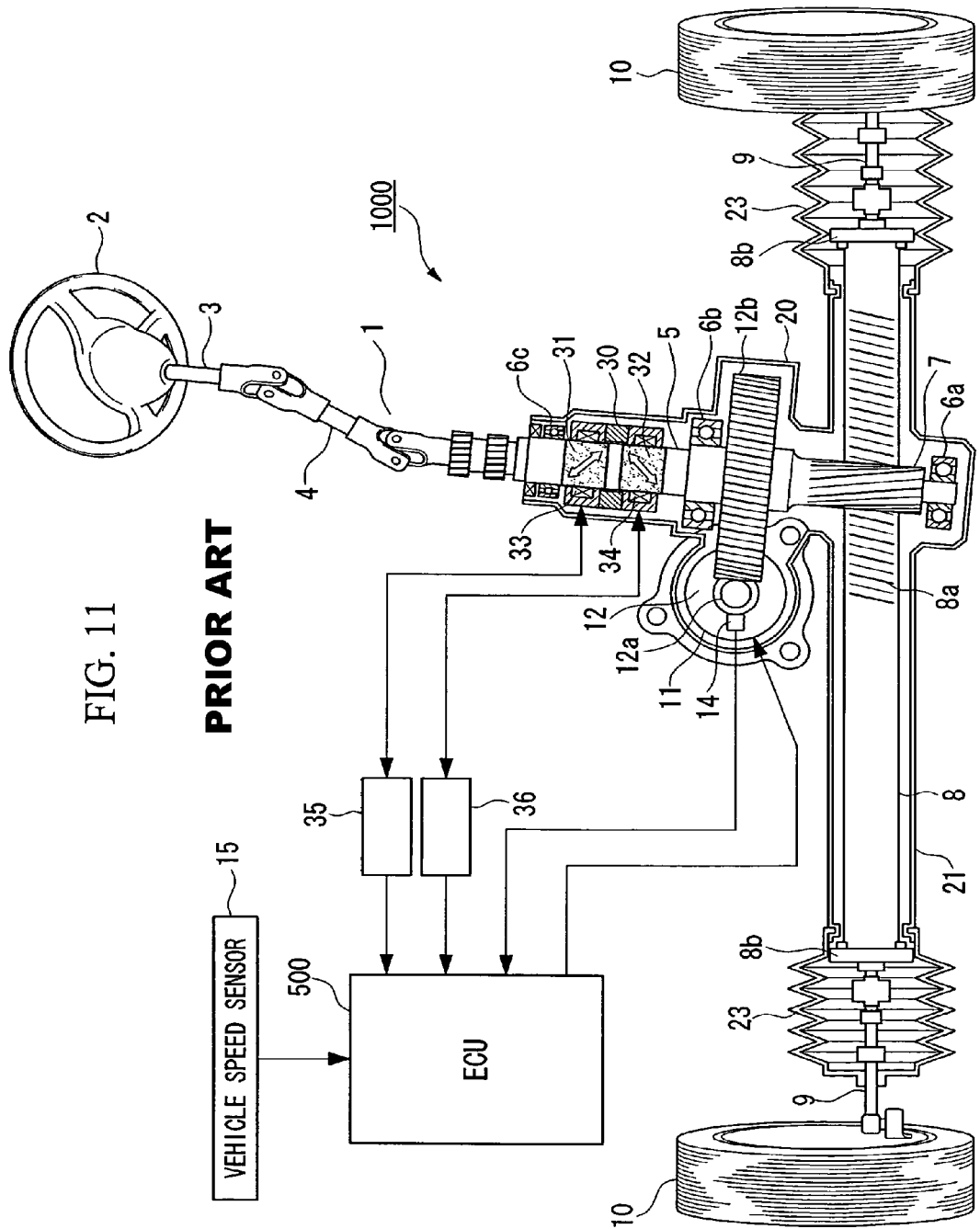
FIG. 11 is a diagram showing the structure of a conventional electric power steering system according to the present invention.

Next, a subtraction target current Ig corresponding to the additional steering torque Tz (i.e., the increment of the steering torque corresponding to the rotation speed S) is computed by referring to a subtraction target current table based on a graph as shown in FIG. 10. In this subtraction target current table, the subtraction target current Ig=0 when the additional steering torque Tz=0, and the subtraction target current Ig decreases in a linear-function form in accordance with an increase in the additional steering torque Tz.

The reference target current Ib and the subtraction target current Ig are then added to each other, and the sum is defined as a target current. Therefore, this target current is smaller than the reference target current Ib and is output to the contact b of the switching device.

The current flowing through the motor 11, measured by the current sensor 60, is input into the drive circuit 56, and the ECU 50 controls the torque output from the motor 11 by performing PID control so that the current measured by the current sensor 60 coincides with the target current, thereby controlling the assistance torque corresponding to the assistant steering power.

In the electric power steering system 100 of the second embodiment, when the rotation speed S of the motor 11 is equal to or greater than the predetermined value A, the target current of the motor 11 can be smaller than the reference target current Ib corresponding to the specified steering torque Ta (i.e., the steering torque when the rotation speed S is the predetermined value A); thus, it is possible to reduce the assistant torque Tas generated by the motor 11. As described above, when the assistant torque Tas is decreased, the same load torque TL cannot be obtained without an increase in the actual steering torque Ts, and thus the driver has a heavy steering feeling.

Similar effects are obtained when the steering wheel 2 is rotated toward the maximum rotation angle. Even when there is a steering input at a high steering speed in the vicinity of the maximum rotation angle of the steering wheel 2, after the rotation speed S of the motor 11 exceeds the predetermined value A (i.e., the steering speed exceeds a predetermined value), the assistant torque by the motor 11 rapidly decreases, thereby reducing the rotation speed S. Therefore, it is possible to reduce the moving speed of the rack 8 in the width direction of the vehicle.

As a result, when the stopper 13 fits to the fitting portion 22 of the rack housing 21 at the maximum rotation angle of the steering wheel 2, the moving speed of the rack 8 can be lower. Therefore, it is possible to suppress compressive deformation of the stopper 13 which is caught between the rack end 8b and the fitting portion 22. Even if the stopper 13 is compressively deformed and the rack end 8b hits the open end 21a of the rack housing 21, the generation of a foreign sound can be reduced. In addition, the moving speed of the rack 8 can be decreased before the rotation angle of the steering wheel 2 reaches the maximum. Therefore, when the rotation angle of the steering wheel 2 reaches the maximum, it is possible to reduce impact loads applied to an engaging portion of the rack teeth 8a and the pinion 7, and the bearings 6a and 6b and the steering gear box 20 which support the rack 8 and the pinion 7.

The target current computing process performed by the target steering torque computing section 57 and the target current computing section 58 when the steering speed is equal to or greater than a predetermined value may be performed only when the steering angle of the steering wheel 2 is equal to or greater than a predetermined value. In this case, the moving speed of the rack 8 can be reduced only when the steering angle becomes close to the maximum rotation angle of the steering wheel 2, thereby reliably suppressing the generation of a foreign sound at the maximum rotation angle of the steering wheel 2.

In the second embodiment, after the target steering torque T0 is computed, the target current is computed by the target current computing section 58 by using the reference target current Ib and the subtraction target current Ig. However, this is not a restrictive manner. For example, the base current may be reduced according to the steering speed so that the target steering torque T0 coincides with the actual steering torque Ts.

OTHER EMBODIMENTS

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the electric steering system of the present invention is not limitedly applied to the electric power steering systems in the above-described embodiments but can also be applied to a steering system employing a SBW (steering by wire) system.

In the SBW system, an operating device such as a steering wheel and a steering mechanism are mechanically separated from each other, and a reaction motor for applying a reaction to the operating device and a steering motor (included in the steering mechanism) for generating power for steering the steered wheels are provided.

What is claimed is:

1. An electric steering system comprising:
   a steering input measuring device for measuring a steering input which is input into a steering system;
   a steering speed measuring device for measuring a steering speed of the steering system;
   a target current computing section for computing a target current based on the steering input measured by the steering input measuring device; and
   a control section for applying a steering power to the steering system by driving a motor according to the target current, and applying damping to the steering system based on the steering speed measured by the steering speed measuring device,
   wherein the control section performs a damper gain control in which a damper gain for the damping is increased as the steering speed increases, and a rate of the increase in the damper gain defined when the steering speed is equal to or greater than a predetermined value is higher than a rate of the increase in the damper gain defined when the steering speed is less than the predetermined value.

2. The electric steering system according to claim 1, wherein the damper gain is increased in accordance with an increase in the vehicle speed.

3. The electric steering system according to claim 1, further comprising:
   a steering angle measuring device for measuring a steering angle of the steering system, wherein when the steering angle measured by the steering angle measuring device is equal to or greater than a predetermined value, the control section performs the damper gain control.

4. The electric steering system according to claim 1, wherein increased damper gain effectively reduces output from the motor and thereby increases resistance to said steering input.

5. An electric steering system comprising:
- a steering input measuring device for measuring a steering input which is input into a steering system;
- a steering speed measuring device for measuring a steering speed of the steering system;
- a target current computing section for computing a target current based on the steering input measured by the steering input measuring device; and
- a control section for applying a steering power to the steering system by driving a motor according to the target current, and applying damping to the steering system based on the steering speed measured by the steering speed measuring device,
- wherein the control section performs a damper gain control in which a damper gain for the damping is increased as the steering speed increases, and the damper gain defined when the steering speed is equal to or greater than a predetermined value has a constant value which is increased in a step form from values of the damper gain defined when the steering speed is less than the predetermined value.

6. The electric steering system according to claim 5, wherein the damper gain is increased in accordance with an increase in the vehicle speed.

7. The electric steering system according to claim 5, further comprising:
- a steering angle measuring device for measuring a steering angle of the steering system, wherein
- when the steering angle measured by the steering angle measuring device is equal to or greater than a predetermined value, the control section performs the damper gain control.

8. The electric steering system according to claim 5, wherein increased damper gain effectively reduces output from the motor and thereby increases resistance to said steering input.

* * * * *